(12) United States Patent
Gu

(10) Patent No.: US 9,187,322 B2
(45) Date of Patent: Nov. 17, 2015

(54) HYDROGEN GENERATOR

(75) Inventor: Zhijun Gu, Shanghai (CN)

(73) Assignee: HORIZON FUEL CELL TECHNOLOGIES PTE. LTD, Singapore (SG)

( * ) Notice: Subject to any disclaimer, the term of this patent is extended or adjusted under 35 U.S.C. 154(b) by 1012 days.

(21) Appl. No.: 13/252,231

(22) Filed: Oct. 4, 2011

(65) Prior Publication Data

US 2012/0087843 A1 Apr. 12, 2012

(30) Foreign Application Priority Data

Oct. 12, 2010 (CN) .......................... 2010 1 0503542

(51) Int. Cl.
*C01B 6/00* (2006.01)
*B01J 7/02* (2006.01)
*C01B 3/06* (2006.01)

(52) U.S. Cl.
CPC ............... *C01B 3/065* (2013.01); *Y02E 60/362* (2013.01)

(58) Field of Classification Search
USPC ............. 48/61, 127.1, 127.9; 423/648.1, 650, 423/651, 652
See application file for complete search history.

(56) References Cited

U.S. PATENT DOCUMENTS

2011/0143235 A1* 6/2011 Ku et al. ........................ 429/416

\* cited by examiner

*Primary Examiner* — Kaity Handal
(74) *Attorney, Agent, or Firm* — Rhodes IP PLC; Christopher R Rhodes

(57) ABSTRACT

A hydrogen generator (1), particularly for supplying a fuel cell, is described comprising a supply (3, 29) of a fuel, i.e. a chemical hydride, which can be hydrolyzed to be reacted in a reaction chamber (14, 33) communicating with the first supply (3, 29) to produce hydrogen gas and an at least partially liquid exhaust reaction product, the reaction chamber communicating with outlet pathways (16, 17) for the hydrogen gas and for the exhaust reaction product, the latter (17) leading to a supply of an absorbent material (21) suitable for immobilizing the exhaust reaction product.

13 Claims, 2 Drawing Sheets

HYDROGEN GENERATOR

FIELD OF THE INVENTION

The invention relates to a hydrogen generator, particularly for supplying a fuel cell, comprising a supply of a fuel which can be hydrolyzed to be reacted in a reaction chamber communicating with the first supply to produce hydrogen gas and an at least partially liquid exhaust reaction product, the reaction chamber communicating with outlet pathways for the hydrogen gas and for the exhaust reaction product. The fuel, in the present context, can be a chemical hydride such as sodium borohydride or ammonium borane, preferably comprising an additional stabilizing agent such as sodium hydroxide or lithium hydroxide.

BACKGROUND OF THE INVENTION

It is known that hydrogen is generated by hydrolysis of a solid chemical hydride reacting with and acidic, aqueous reagent see US 2005/0238573.

Also known is a corresponding fuel in aqueous solution, reaction being promoted by a catalyst. In this prior art, in a volume exchange cartridge the decreasing of the fuel compensates the increasing volume of the reaction products see U.S. Pat. No. 7,105,033.

In the prior art, there is the problem of separating the useful gaseous hydrogen from the exhaust liquid product, and of handling the latter, particularly if the generator is an orientation insensitive device.

SUMMARY OF THE INVENTION

It is an object of the invention to provide an apparatus for a hydrogen generation to manage the exhaust products optimally.

To attain this object, in a hydrogen generator of the invention, the apparatus is characterized in that the outlet pathway for the exhaust reaction product leads to a supply of an absorbent material suitable for immobilizing the exhaust reaction product.

By such immobilization, the hydrogen generator is orientation insensitive to a very high degree since mainly no liquid exhaust products stay in the system.

The invention is applicable to all sorts of hydrogen generators, particular reference being made to such generators which comprise, besides the supply of the solid fuel, a second supply of a reaction agent to be reacted with the solid fuel, or a catalyst promoting the reaction in using a liquid fuel.

Preferably, the absorbent material is a material suitable for swelling upon absorbing the exhaust reaction product. By swelling, the absorbent material is capable of embedding a high amount of liquid. After complete use, the absorbent material can be discarded.

The swelling absorbent material preferably comprises a superabsorber which is a material known in the art, e.g. contained in modern napkins and binding a considerable amount of aqueous liquid. Preferable further contained is a wicking material such as an absorbing tissue, suitable for distributing the mainly liquid exhaust reaction product in the absorbent material.

The maximum liquid binding capacity of such superabsorber appears in a ph neutral environment. Therefore, it is preferred that, the absorbent material further comprises materials suitable for adjusting the ph value. Generally, the liquid reaction product tends to have an acid character which is to be neutralized. Furthermore, the borates contained in the exhaust reaction product, tend to block the binding capacity of the absorbent material. Therefore, it is preferred to add certain agents which promote crystallization of the borates such as probably calcium ions.

Advantageously, the absorbent material comprises at least one additional pathway to avoid a congestion and resulting blockage of the absorbent material with reference to a through path of the gaseous hydrogen and a still liquid exhaust product.

According to a preferred embodiment, and in order to achieve a volume compensation for the increasing volume of the absorbent material, the hydrogen generator parts are arranged in a volume exchange manner. According to the mentioned first design, the second supply and the absorbent material are encapsulated in a cartridge, the reaction agent is a material the volume of which in the second supply decreases upon proceeding of the reaction, and the absorbent material capable of swelling and the reaction agent have an interface between them capable of moving, for volume compensation, into the volume of the second supply; and according to the second design, the first supply and the absorbent material are encapsulated in a cartridge, the fuel is a material the volume of which in the first supply decreases upon proceeding of the reaction, and that the absorbent material capable of swelling and the fuel have an interface between them capable of moving, for volume compensation, into the volume of the first supply. Thus, there is no waste of bulky, unused volume, and at least part of the generator can be placed within a compact safe cartridge.

BRIEF DESCRIPTION OF THE DRAWING

The foregoing and further objects, features and advantages of the present invention will become apparent from the following description of a preferred embodiment with reference to the accompanying schematic drawings.

DETAILED DESCRIPTION OF A PREFERRED EMBODIMENT

Figure 1:
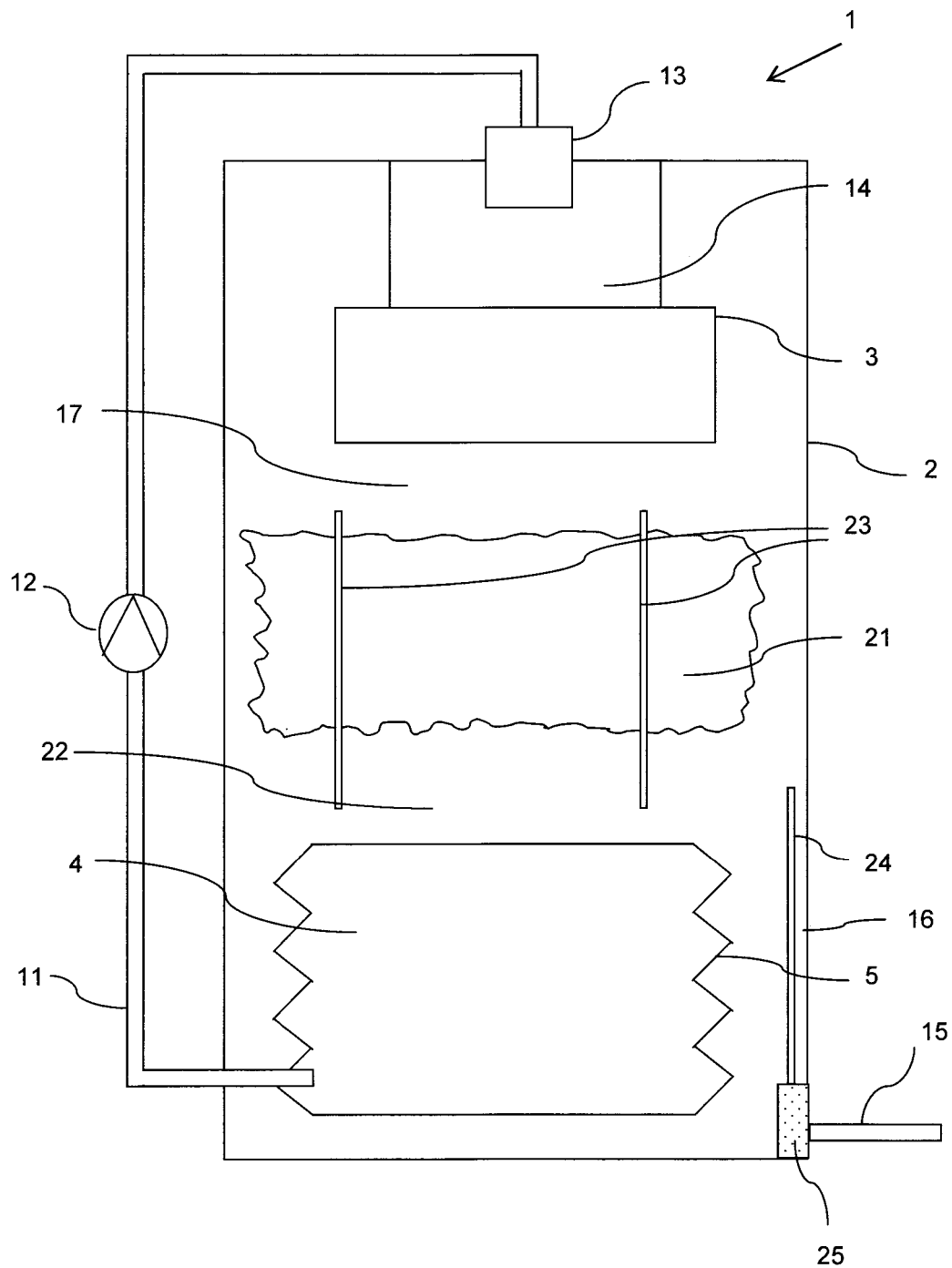
FIG. 1 shows a hydrogen generator using a solid fuel and a liquid reaction agent.

According to FIG. 1 a hydrogen generator 1 comprises a cylindrical cartridge 2 which contains a first supply 3 of a fuel which, in the present configuration, is a solid block of, e.g. sodium borohydride ($NaBH_4$), containing a stabilizing agent such as metal hydroxides or the like, as known from US 2005/0238573 paragraph [0028]. It further comprises a second supply 4 of a reaction agent that is a aqueous acidic solution such as phosphoric acid to which possibly a catalyst is added, as known from US 2006/0269470 paragraph [0027, 0028]. The second supply is within a bellow 5 compressible in the axial direction of the cylindrical cartridge 2. The bellow 5 has an outlet conduit 11 which via a pump 12 is connected to a distributor 13 that is arranged at the, in the drawing, top of the cylindrical cartridge 2. The reaction agent is fed via the outlet conduit 11 feds from the second supply 4 to the distributor 13 and further to the solid fuel in the first supply 3. The distributor 13 disperses the reaction agent onto the solid fuel in a way known from US 2008/0286195 paragraph [0019]. The fuel contacted by the reaction agent reacts, in the volume aside the block the first supply 3, which volume acts as a reaction chamber 14, to gaseous hydrogen which is the useful product and exhaust reaction products, i.e. borates and water among other things. For outputting the gaseous hydrogen, a hydrogen outlet 15 is arranged at the cartridge 2, in the drawing at its bottom part. The reaction chamber is continued in a pathway 16 leading to the hydrogen outlet 15 and a pathway 17 leading to an absorbent material 21.

The absorbent material binds the mainly liquid exhaust products resulting from the reaction while a pass through of the gaseous, useful hydrogen is still possible; thus it serves as a gas filter to a very high degree. It can consist of e.g. sponge, textile tissues or cotton wool. These materials mainly keep their volume when sucked with liquid; further they tend to drop or bleed. Preferably, however, the absorbent material contains a swelling superabsorber. Superabsorbers are known in the art and are capable of sucking a multiple of their own weight. They can consist of a copolymer of acrylic acid and sodium acrylate. The absorbent material further contains a wicking material consisting of an absorbing tissue. If without a wicking material, the liquid exhaust product would hit the superabsorber and create sucked regions at the surface only, without reaching the interior. The absorbent material further comprises materials to maximize the sucking capacity by adjusting the ph value of the exhaust reaction product which is predominantly acidic but should be neutralized and certain agents which promote crystallization of the borates such as calcium ions, so as to avoid a blocking by the borates. An example of such an absorbent material is a stack layers cut out from napkins for babies, which stack was compressed under high pressure; or layers of toilet paper sandwiching the other mentioned components and also compressed. The superabsorber avoids dropping and bleeding.

The bellow 5 and the absorbing material 21 have an interface 22. In consequence of the absorption, the absorbent material 21 increases its volume and the second supply 4 decreases its volume tightening the bellow 5, whereby the interface 22 is shifted towards the bellow 5. This provides for a volume exchange within the cartridge 2. While the block of the absorbing material 21 increase in volume, there is the risk that the pathway 16 for the hydrogen and partially also the pathway 17 for the exhaust reaction material shrinks. To avoid the pathways to be blocked additional pathways 23 pass through the absorbing material 21 and additional pathways 24 pass along the bellow 5. The additional pathways 23 have pores through which the liquid exhaust product can pass through into the absorbing material 21. These pathways 23 are hydrophobic for avoiding crystallization in the pores. The additional pathways 23 also have the function of keeping the penetrability after a longer time of non-operation, after which the composition of the exhaust reaction product becomes somewhat different, i.e. becomes increasingly crystallized creating an impermeable film.

Additional to the already installed filter, i.e. the absorbing material 21, another gas-liquid filter 25 can optionally be added directly in front of the hydrogen outlet 15 to secure that only pure hydrogen gas leaves the hydrogen generator 1. Suitable materials for the additional gas-liquid filter 25 are membranes as known from US 2008/0286195 paragraph [0017].

To control the hydrogen generation rate the pressure within the cartridge 2 is measured and if the pressure sinks under a certain predefined threshold, the pump rate is increased as know from US 2005/0238573 paragraph [0042].

Figure 2:
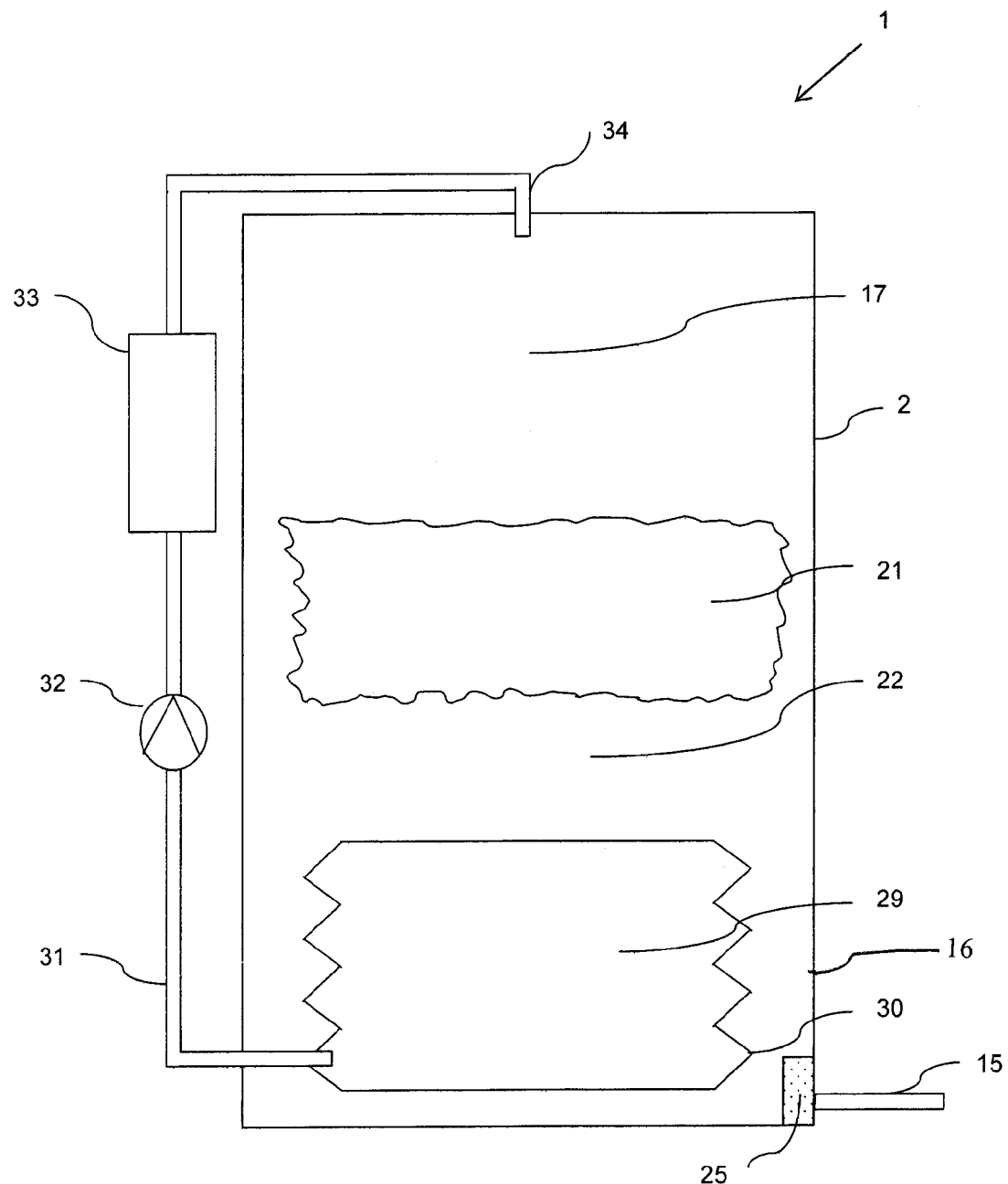
FIG. 2 shows a hydrogen generator using a liquid fuel and a catalyst accelerating the reaction.

According to FIG. 2, which shows a different embodiment of a hydrogen generator 1, the cartridge 2, similar to the first embodiment, contains the absorbing material 21. It further contains a supply of a liquid fuel 29, contained in a bellow 30. From the bellow 30 an outlet conduit 31 which via a pump 32 communicates with a closed reaction chamber 33 containing a catalyst is led back into the cartridge 2. Such arrangement is known e.g. from U.S. Pat. No. 7,105,033. The hydrogen gas and the exhaust product enter the cartridge 2 via an input conduit 34. From this, the hydrogen gas passes via its pathway 16 and the additional gas-liquid filter 25 to the hydrogen outlet 15 located at the bottom, as depicted, of the cartridge 2. The exhaust product proceeding via its pathway 17 meets the absorbing material 21 for being entrapped. Again the interface 22 separates the absorbing material 21 from the bellow 30. In this embodiment, while the absorbing material 21 swells, the bellow 30 becomes emptier and shrinks, thus providing for a volume exchange.

REFERENCE LIST 1 hydrogen generator
2 cartridge
3 first supply (of a solid block of fuel)
4 second supply (of a reaction agent)
5 bellow
11 outlet conduit
12 pump
13 distributor
14 reaction chamber
15 hydrogen outlet
16 pathway
17 pathway
21 absorbing material
22 interface
23 additional pathways
24 additional pathways
25 additional gas-liquid filter
29 supply of a liquid fuel
30 bellow
31 outlet conduit
32 pump
33 reaction chamber
34 input conduit

The invention claimed is:

1. A hydrogen generator (1) comprising:
   a cartridge (2);
   a first solid fuel supply (3) located within said cartridge (2), said fuel supply capable of being hydrolized;
   reaction chamber means (14) located within said cartridge (2) communicating with said first fuel supply for producing hydrogen gas and exhaust reaction products;
   a hydrogen gas pathway (16) located within said cartridge (2);
   a hydrogen outlet (15) having an input and an output connected at its input to said hydrogen gas pathway (16);
   an exhaust reaction product pathway (17) located within said cartridge (2); and
   absorbent material means (21) connected to said exhaust reaction product pathway (17) for absorbing, binding and immobilizing the exhaust reaction products;
   second fuel supply means (4) for providing a reaction agent which, when exposed to said first fuel supply, produces a chemical reaction resulting in the hydrogen gas and the exhaust reaction products and the volume of which decreases over time as the reaction occurs;
   volume compensation means (5) located within said cartridge (2) compressible in the axial direction of said cartridge (2) for containing said second fuel supply means (4), said volume compensation means (5) comprising an outlet;
   interface means (22) between said volume compensation means (5) and said absorbent material means (21) for converting the movement of said absorbent material means (21) as it expands into a compression force applied to said volume compensation means (5);

a first transport line (11) comprising an input and an output connected at its input to the outlet of said volume compensation means (5);

a pump (12) comprising an input and an output connected at its input to the output of said first transport line (11);

a second transport line comprising an input and an output connected at its input to the output of said first transport line (11); and a distributor (13) comprising an input and an output connected at its input to the output of said second transport line and at its output to said reaction chamber means (14), wherein said volume compensation means (5) is compressed as said absorbent material means (21) expands due to absorption of the exhaust reaction products.

2. The hydrogen generator of claim 1 wherein said second fuel supply means (4) comprises a catalyst promoting the reaction within said reaction chamber means (14).

3. The hydrogen generator of claim 1, wherein said absorbent material means (21) further functions to separate the hydrogen gas from the exhaust reaction products.

4. The hydrogen generator of claim 3, wherein said absorbent material means (21) swells as it absorbs the exhaust reaction products.

5. The hydrogen generator of claim 4, wherein said absorbent material means (21) comprises a superabsorber and a wicking material suitable for distributing the exhaust reaction product within the absorbent material.

6. The hydrogen generator of claim 5, wherein the wicking material is an absorbing tissue.

7. The hydrogen generator of claim 3, wherein the material from which said absorbent material means (21) is made is at least one material selected from the group consisting of sponge, textile tissue or cotton wool.

8. The hydrogen generator of claim 1, wherein said absorbent material means (21) further functions to reduce the pH level of the exhaust reaction products.

9. The hydrogen generator of claim 8, wherein said absorbent material means (21) further functions to crystallize borates contained in the exhaust reaction products.

10. The hydrogen generator of claim 1, further comprising at least one additional porous pathway (23) located within cartridge (2) passing through said absorbent material means (21) wherein each said pathway (23) is hydrophobic and retains penetrability even after a sustained period of operational disuse.

11. The hydrogen generator of claim 1, further comprising gas-liquid filter means (25) comprising an input and an output connected at its input to said hydrogen gas pathway (16) and at its output to said hydrogen outlet (15) for ensuring that only hydrogen gas enters said hydrogen outlet (15).

12. The hydrogen generator of claim 11, further comprising at least one additional pathway (24) located within cartridge (2) passing alongside of the volume compensation means (5) and connected at its output to the input of said gas-liquid filter means (25).

13. The hydrogen generator of claim 1 wherein said volume compensation means is a bellows.

* * * * *